Figure 1:
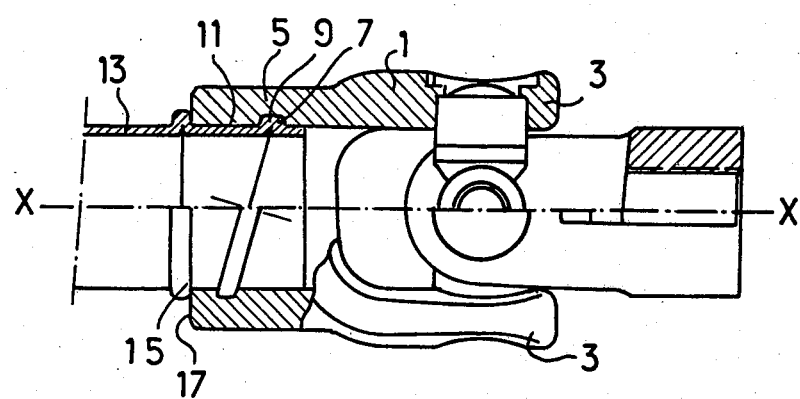

United States Patent [19]

Mallet

[11] 4,390,303
[45] Jun. 28, 1983

[54] TORQUE TUBE-TO-UNIVERSAL JOINT YOKE DEFORMATION COUPLING

[75] Inventor: Bernard Mallet, Limay, France
[73] Assignee: Nadella, France
[21] Appl. No.: 290,019
[22] Filed: Aug. 4, 1981

[30] Foreign Application Priority Data

Aug. 6, 1980 [FR] France ............................... 80 17338

[51] Int. Cl.³ ........................ B25G 3/28; F16G 11/00
[52] U.S. Cl. .................................... 403/284; 29/451; 29/453; 29/523; 403/263; 285/382.4
[58] Field of Search ............... 403/274, 284, 263, 373; 29/207, 522 R, 523, 451, 453; 285/382.4, 382.5

[56] References Cited

U.S. PATENT DOCUMENTS

| 609,030 | 8/1898 | Keller | 285/382.5 |
| 1,950,947 | 3/1934 | Mulroyan | 403/274 X |
| 3,551,999 | 1/1971 | Gutmann | 403/274 X |
| 4,142,843 | 5/1979 | Kish | 285/382.4 |

FOREIGN PATENT DOCUMENTS

| 455785 | 3/1950 | Italy | 285/382.4 |
| 29407 | of 1896 | United Kingdom | 403/274 |

Primary Examiner—Wayne L. Shedd
Attorney, Agent, or Firm—Robert E. Burns; Emmanuel J. Lobato; Bruce L. Adams

[57] ABSTRACT

In this device, the bore of the cylindrical hub has a groove in the shape of an ellipse in which is engaged a radial boss obtained by an upsetting of the material of the end portion of a tubular element inserted in the bore so as to ensure both the axial and rotational connection with the hub. The upsetting is achieved by means of a punch inserted in the end portion of the tubular element and bearing against the extremity of this end portion.

3 Claims, 2 Drawing Figures

TORQUE TUBE-TO-UNIVERSAL JOINT YOKE DEFORMATION COUPLING

DESCRIPTION

The present invention relates to a transmission device comprising a yoke of a universal joint or any other coupling means provided with a cylindrical hub in the bore of which is axially and circumferentially fixed the end of a tubular element, which is also cylindrical and has for this purpose at least one radial boss obtained by a deformation or upsetting of the material and engaged in a cavity formed in the bore of the hub.

An object of the invention is to provide a transmission device of this type in which the interconnection is capable of resisting both torques and axial tensile forces, and which is simpler and cheaper to make than the arrangements known in particular from French Pat. Nos. 1,496,324 and 2,148,907.

For this purpose, the transmission device according to the invention is so arranged that the cavity is formed by a groove constituting a curve such as an ellipse, which has at every point thereof a tangent which is inclined relative to the axis of the hub and in which penetrates the radial boss obtained by an upsetting or a spreading of the material of the end of the tubular element.

Preferably, the tubular element comprises an abutment bead formed by a radial pinching bearing against the adjacent end of the hub.

Another object of the invention is to provide a method for producing the transmission device which comprises introducing the tubular element in the bore of the hub which is previously provided with a groove forming a curve which has at every point thereof a tangent which is oblique relative to the axis of the hub, fitting in said element an insert which bears against the end of said element, and exerting an axial force on said insert so as to urge the material of the tubular element into the groove.

Figure 2:
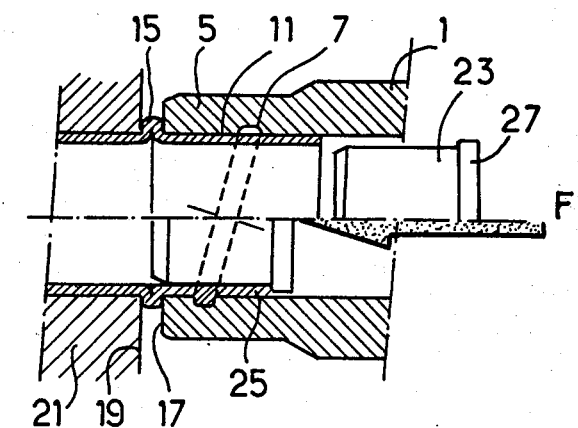

The invention will be explained in the ensuing description of an embodiment of the invention which is given solely by way of example and is shown in the accompanying drawings in which:

FIG. 1 is an axial sectional view of a device according to the invention applied to a yoke of a universal joint of a steering column of an automobile vehicle, and FIG. 2 illustrates the successive stages of a method for producing the device shown in FIG. 1.

FIG. 1 is an axial sectional view of a device according to the invention which comprises a coupling element 1 made from steel or a like alloy such as for example aluminium and whose end has been cut out so as to form the two branches 3 of a yoke of a universal joint, the other end of said element being in the form of a hub 5 of circular cross-sectional shape whose bore has in the wall thereof at least one cavity or groove which is in the form of a curve which has at every point a tangent which is oblique relative to the axis X—X of the device, for example a closed curve such as the illustrated ellipse 7 whose plane is inclined relative to the axis X—X or such as a portion of a helix, said cavity being adapted to receive a radial boss 9 of corresponding shape produced on the end 11 of a tubular element 13 which is inserted in said bore and is subjected to a material expanding or upsetting operation, in accordance with a method described hereinafter, for producing the boss which will fill the aforementioned cavity or for increasing the dimensions of a boss pre-formed on said end and disposed in the region of or in the cavity so as to be enlargened after said operation and ensure, in cooperation with said cavity, the interconnection of the elements 1 and 13 both axially and in rotation.

It is clear that the arrangement according to the invention permits by cheap means, constituted by a cavity cooperating with a boss of corresponding shape, ensuring the aforementioned interconnection and dispensing with cooperative splines which, in some known arrangements, in particular applicable to steering columns, transmit the torque.

As the hub and the tubular element are substantially cylindrical, the cavity may have any shape other than circular with an axis X—X, its obliqueness ensuring under all circumstances the permanency of the rotational drive.

A radial pinching 15 formed adjacent the end or in the body of the tubular element and bearing against the radial face 17 of the end of the hub, constitutes an axial abutment in particular when forming the boss, which, according to a method which is also part of the present invention and is shown diagrammatically in FIG. 2, permits, as soon as the end 11 of the tubular element is inserted in the hub 5 and blocked axially by the aforementioned pinching between the face 17 and the radial shoulder 19 of a die 21 through which said element extends, the introduction into the element adjacent the branches 3, of an insert 23 comprising a body of complementary shape which bears against the inner surface of said element whose free end 25 constitutes an axial abutment for the radial shoulder 27 of the insert which, when shifted axially in the direction of arrow F by suitable means, for example a press, causes the deformation of said tubular element and the urging of the material into the cavity or groove 7 previously formed in the wall of the bore. This insert, which performs the function of a punch, may be left inside the tubular element.

According to a modification of the invention, the tubular element comprises initially, the pre-formed blank of a boss which is introduced in an axial indexing groove formed in the hub and places itself in alignment with or in the aforementioned cavity before the upsetting of the material which causes the spreading of the boss inside the cavity and thus achieves the interconnection.

Having now described my invention what I claim as new and desire to secure by Letters Patent is:

1. In a transmission device comprising a coupling including a cylindrical hub which has a longitudinal axis and defines a bore, and a tubular element which has a cylindrical end portion which is axially and circumferentially fixed in said bore and has for this purpose at least one radial boss obtained by an upsetting of the material of the tubular element and engaged in a cavity formed in the bore of the hub; the improvement wherein said cavity is constituted by a groove forming a curve which has at every point thereof a tangent which is inclined relative to the axis of the hub.

2. A device according to claim 1, wherein the groove is in the shape of an ellipse contained in a plane which is inclined relative to the axis of the hub.

3. A device according to claim 1 or 2, wherein the tubular element comprises a radial pinched portion which bears against the end of the hub.

* * * * *